April 18, 1939.  C. N. SMITH  2,154,478
EDUCATIONAL SYSTEM
Filed Aug. 18, 1936   2 Sheets-Sheet 1

INVENTOR
CLARENCE N. SMITH
BY
ATTORNEY

April 18, 1939.  C. N. SMITH  2,154,478
EDUCATIONAL SYSTEM
Filed Aug. 18, 1936   2 Sheets-Sheet 2

INVENTOR
CLARENCE N. SMITH
BY
ATTORNEY

Patented Apr. 18, 1939

2,154,478

UNITED STATES PATENT OFFICE 2,154,478

EDUCATIONAL SYSTEM

Clarence N. Smith, Silver Spring, Md.

Application August 18, 1936, Serial No. 96,592

7 Claims. (Cl. 35—5)

(Granted under the act of March 3, 1883, as amended April 30, 1928; 370 O. G. 757)

My invention relates to teaching the arts of touch typewriting and signal code reception, and to teaching the two simultaneously.

One object of my invention is to facilitate the training of operators in receiving code signals aurally and recording their equivalents upon the typewriter by means of the touch system.

Other objects and advantages of my invention will be apparent from this specification.

In U. S. Patent 1,984,599, issued December 18, 1934, Josef Safar discloses a representation of a typewriter keyboard, having illuminating means for each character thereof, and operable by electrical means actuated from the keys of a typewriter. He uses this indicating device in close proximity to the typewriter and the student, and has the student operate the device in carrying out his method of individual self-instruction. The method of actuating displays of various descriptions from keyboards similar to those of a typewriter is old in several arts, notably educational toys and electric signs.

In my invention, I employ a large indicating device, in the form of a display board, representing the keyboard of a typewriter, similar in its general features to the one disclosed in the patent to Safar, but adapted to be displayed from the wall of a classroom. I likewise use electrically controlled means for actuating the illumination of said indicating device, but I do this by means of a push-switch control box, which may be directly operated by hand or from the keys of a typewriter superimposed thereon. The face of my indicating device is marked to show which fingers should be used in striking the individual keys. I further provide that the various characters on the indicating device are not visible on the face thereof unless the lights coordinated therewith are lighted.

In addition to instruction methods previously employed in the art, I introduce simultaneous expression of the various keyboard characters in signal code and by visual means.

Figure 1:
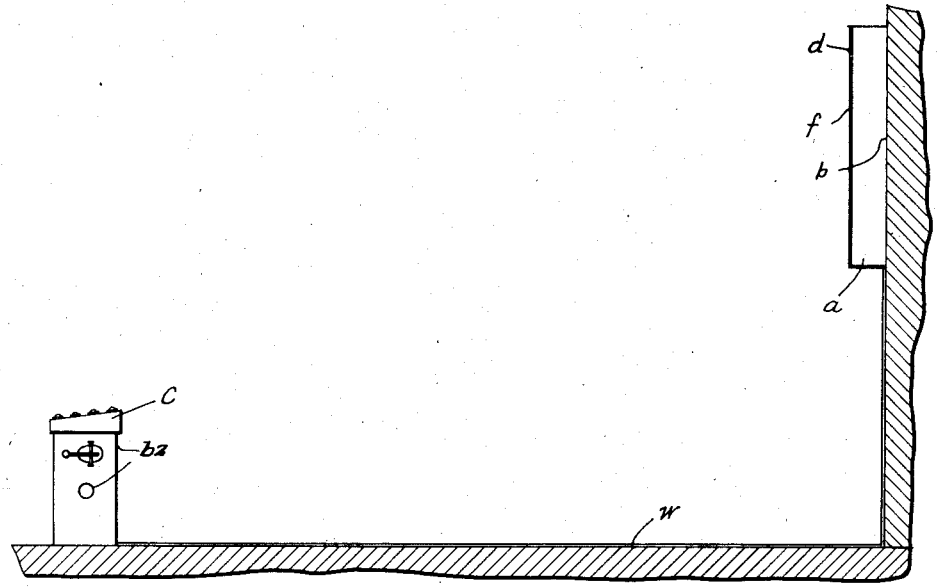
Fig. 1 shows a general arrangement of the elements of my invention in a room used for instruction purposes.

Referring to the drawings, in which like reference letters are used to designate like parts throughout, and looking first at Fig. 1: $a$ is a display board, comprising back and front members, $b$ and $f$ respectively, of wood or like material, separating members of the same material, a plurality of electric lights in appropriate sockets, one for each character to be shown on the front of the board, secured and wired to the back member, shields surrounding each of the electric lights and extending between the back and front members, and a chart or diagram, covering the face of the front member and drawn to scale to represent the keyboard of a typewriter; the front member has holes the size of the diagrammatic representations of the various typewriter keys bored therein at the points where the shields join the front member to allow the illumination from the electric lights to show through the chart and illuminate the characters and keys thereon; $d$ is the diagrammatic chart, representing the keyboard of a typewriter, which covers the front member of the display board; $c$ is a push-switch control box, which contains one control switch for each light in the display board, and which may contain connections for coupling the system to an energizing power source; $w$ is a cable carrying necessary connectors for coupling the electric lights to the control switches and power source. In the arrangement shown, the display board is mounted on the front wall of a classroom and the cable extends therefrom to the control box which is mounted at the rear of the room. It will also be convenient to mount the signal code transmitting apparatus, which may be a telegraph key and sounder, or any buzzer-tone transmitter, along with or nearby the control box. Such a transmitting apparatus is represented by $bz$ on the side of $c$.

Figure 2:
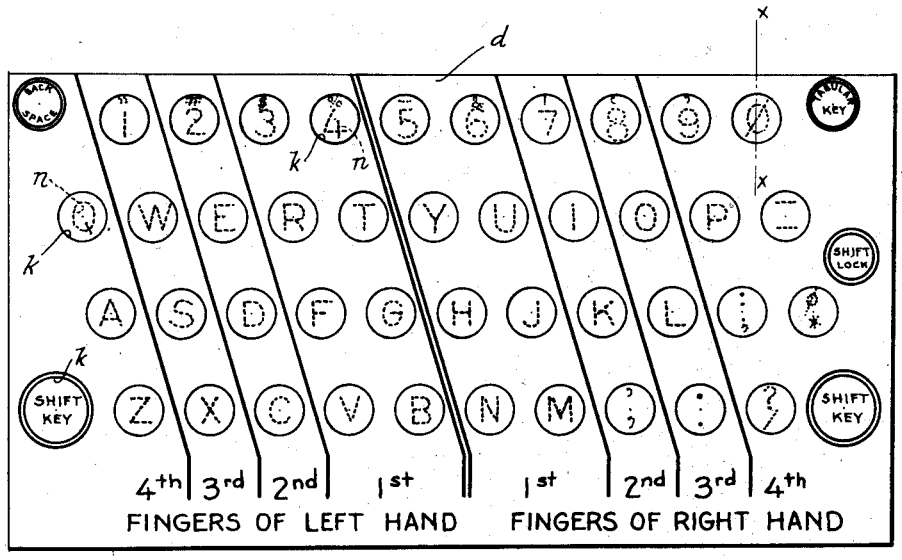
Fig. 2 represents the front view, or face, of the display board.

In Fig. 2, $d$ represents the diagram, or chart, which forms the front of the display board; $k$ denotes heavy circles drawn on the face of the chart to represent the various keys of the typewriter; and $n$ indicates the various characters which are drawn reversed on the back of the chart. As shown, this is a reproduction to scale of the keyboard of a standard telegraphic typewriter. All keys and the characters or legends thereon are shown in their relative positions and proportions as they appear on the keyboard. The diagram is drawn on paper, or other translucent material, sufficiently translucent to permit some light to pass therethrough, but sufficiently opaque to prevent the characters drawn on the reverse side of the material from showing through unless each character is illuminated by the particular electric light provided for that purpose. The forty-two typewriter keys have their characters drawn reversed on the reverse side of the chart so that the characters appear within their proper circles when illuminated from behind, but otherwise these keys show only as blank circles on the front of the chart. The mechanical keys are represented on the face of the chart with their legends directly inscribed. In the adaption of the invention herein described, only the forty-two character keys are provided with individual illuminating means, although obviously the representations of any keys desired may be thus fitted for illumination. The face of the chart is further marked to indicate the keys which are to be struck with the various fingers. A double diagonal line is drawn across the chart between the keys 4, T, G, and B, on the left, and 5, Y, H, and N, on the right. At the bottom of the chart, below the keys to the right of this line, appears the legend, "Fingers of right hand", while in similar position to the left appears the legend, "Fingers of left hand". Parallel to the aforesaid double line, single lines are drawn across the chart, starting at the top, between the keys Q and W, 1 and 2, 2 and 3, 6 and 7, 7 and 8, and 8 and 9. Below the divisions thus made, by the single and the double lines, and just above the previously mentioned legends, appear, from left to right, "4th, 3rd, 2nd, 1st, 1st, 2nd, 3rd, 4th". In this figure, $x$—$x$ is the center line of one of the shields which contain the electric lights for illuminating the representations of the keys. A sectional view through this line is shown in a later figure.

Figure 3:
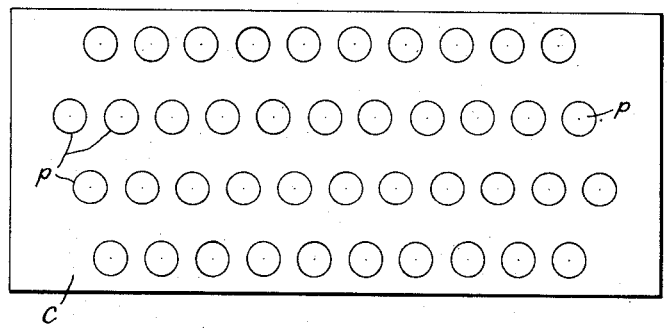
Fig. 3 is a plan view of the push-switch control box, showing the buttons representing the keyboard characters in place.
Figure 6:
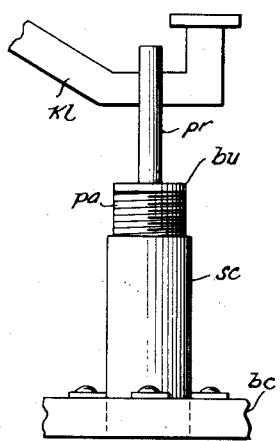
Fig. 6 shows a side view of one of the push-switches with a typewriter key lever in place in its slotted stem.

In Fig. 3, $p$ is used to designate the removable buttons on the top of the push-switch rods. These buttons are marked to represent the keys of a standard typewriter keyboard. They may be attached to the tops of the rods by any convenient standard method. In the preferred embodiment, the control box $c$ is designed so that it will accommodate within its own base, the base of a standard typewriter. The push-switches are arranged in form and order to correspond with the keyboard. There are individual switches to control the illumination of each character designed for illumination on the chart $d$. The switches are connected so that when a key is struck, the corresponding character will be illuminated on the display board. The push-switch rods are slotted at the top to accommodate the key levers of the typewriter when the removable buttons $p$ are taken off. The mechanical details of this connection are shown in Fig. 6, described below.

In another embodiment of the invention, the push-switches described above may be replaced by ordinary push-buttons, properly labelled, or any convenient type of switch for individually controlling the separate circuits of the display board. In this latter embodiment, the switches are manually operated, without the aid of a standard typewriter keyboard.

Figure 4:
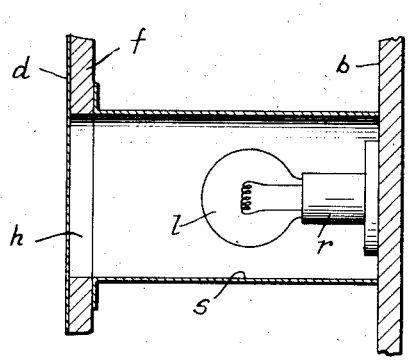
Fig. 4 is a sectional view of the illuminating means employed in connection with each character to be displayed on the face of the display board.

Fig. 4 is a section through $x$—$x$ of Fig. 2, showing the constituent parts of one illuminable unit of the display board; $d$ is the translucent chart or diagram which covers the front of the board; $f$ and $b$ are the front and back members respectively of the display board; $s$ is a shield of metal or other material which extends between the front and back members and is secured to each, having a front diameter equal to the diameter of the circle $k$, which represents a typewriter key in Fig. 2; $h$ is a circular hole in the front member $f$, having the same diameter as the circle $k$; $r$ is a standard base lamp receptacle, secured to back member $b$, wired along or through this member, and surrounded by the shield $s$; $l$ is a standard incandescent lamp of any desired candle power, screwed into the receptacle $r$. The dimensions and physical proportions of the various members described may be varied at will to conform to the size and illumination desired in the display board.

Figure 5:
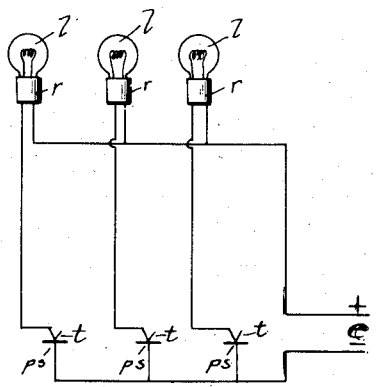
Fig. 5 shows the wiring arrangements embracing the power source, the illuminating means, and the push-switches.

Fig. 5 shows a wiring diagram for connecting the various lamps, push switches, and power sources; $e$ represents a source of power, one side of which is connected to one side of all the lamp receptacles and the other side of which is connected to one pole of all the push switches. The circuit is completed from the other side of all the lamp receptacles through the contacts $t$ of the push switches $ps$.

Figure 7:
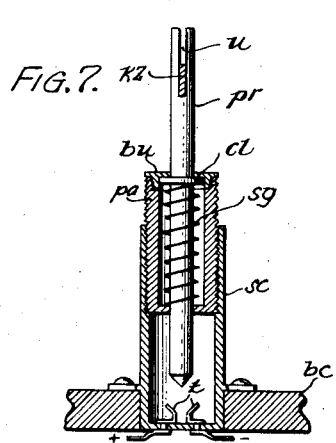
Fig. 7 is a sectional view of one of the push-switches showing the details of mechanical construction and electric wiring.

Figs. 6 and 7 show elevation and sectional views respectively of one of the push-switches, previously mentioned which are used in the control box. In these two views, the removable buttons described in connection with Fig. 3 have been removed from the tops of the push rods. $bc$ is the base of the control box, to which all of the push switches are secured. These switches may be of any conventional design. In the type shown, for illustration, to which this invention is not limited, a cylinder $sc$ has in its lower end two spaced, insulated contacts $t$ which comprise the two poles of the switch. This cylinder has a flange outside near its lower end for securing to a base, and its upper end is threaded internally to accommodate a push rod assembly. This push rod assembly comprises: a cylinder $pa$, bored at the bottom and threaded inside and out; a coil spring $sg$; a push rod $pr$, slotted at the upper end and carrying a collar $cl$ on the upper half of its length; and a bushing $bu$, threaded outside, recessed from below, and bored through the center. When assembled, the spring $sg$ fits inside the cylinder $pa$ and around the push rod $pr$, the push rod extending through said spring and said cylinder with the collar resting against the upper end of the spring, and the bushing $bu$ sliding over the upper end of the push rod, above the collar, and screwing into the top of the cylinder $pa$, closing same. The push switch is complete when the push rod assembly is secured into the cylinder $sc$ by aforesaid threaded means. Depressing the push rod will compress the spring $sg$, allowing the lower end of the rod to travel toward the contacts $t$. In the drawings these contacts are shown flanged at the top and the end of the push rod is shown sharpened, but this construction does not imply any limitation as to the shape of these members. When the push rod is sufficiently depressed, its lower end closes the space between the contacts, thus completing the electrical circuit through the switch. When the pressure on the upper end of the push rod is removed, the compressed spring $sg$, acting against the collar $cl$, returns the rod to its normal position, out of contact with the contacts $t$.

The slot $u$ in the upper end of said push rod is cut to receive any key lever of a standard typewriter keyboard. With the push-switch in place below a typewriter keyboard and one of the key levers inserted in the slot, depressing the key attached to the lever will close the push-switch. When the switch is connected as previously described in this specification, closing it in the aforesaid manner will cause an illuminated representation of said typewriter key to appear on the aforesaid display board. Electrical connections to the two contacts t are made through appropriate securing means under the base bc.

Several useful and practical applications of my invention are described below:

(1) The instructor, by operating proper switches, may show on the display board the characters with which the immediate instruction is concerned, thus concentrating the attention of the students upon these, and away from the keyboards of their own typewriters, and the other characters thereon.

(2) During beginning instruction in signal code reception, the instructor may identify the characters as they are transmitted by causing them to appear illuminated on the display board, thus fixing in the minds of the students the relation between the code and the character represented thereby, and avoiding the necessity of calling out orally the names of the characters transmitted.

(3) Students of touch typewriting, by watching the play of lighted characters on the display board, may follow on their own machines, by touch alone, an exercise conducted by an instructor who is operating the board from a typewriter coupled to the control box as described in this specification. By this means students may acquire speed and develop rhythm.

(4) An experienced operator at the typewriter which operates the display board may demonstrate to beginners the rhythm, the lag in recording, and the memory span suitable for practical recording of code messages by touch typewriting.

(5) By placing the student at the typewriter which operates the wall display, the instructor, while sending code characters, may observe on the display board any errors made by the student. This offers a method of testing the student's accuracy at any time. This is important because in learning any art which must be reduced to a subconscious operation, any error should be corrected without delay, and before repetition of the error if possible.

(6) The instructor, by watching the display board when a student is operating the typewriter connected therewith, can determine the student's maximum speed of reception, and may adjust his speed of sending code thereto, so as to lead the student on to higher speeds in the minimum of instruction time.

(7) The invention finds its most important application in the simultaneous teaching of the arts of signal code reception and touch typewriting. To carry this out, the instructor causes a character to be illuminated on the display board the instant that its code equivalent is transmitted aurally. The student, seated at a standard typewriter, recognizes the character as it appears on the display board, observes the correct finger placement for striking the corresponding key, and associates the code equivalent with the character and the correct finger movement for reproducing same on the typewriter.

The advantages of this method over present methods of training operators will be evident from the following analysis, by noting the reduction in the number of steps required.

BY PRESENT METHODS

*a. Learning the code*

1. Listen to sound of character.
2. Listen to name of character, as repeated by instructor.
3. Record character with pencil.

*b. Learning touch typewriting*

4. Read copy.
5. Find position of characters on desk chart or wall chart.
6. Strike typewriter key.

*c. Recording code by typewriter*

7. Associate sound of character with location of character on keyboard.
8. Strike the key.

BY METHODS OF THIS INVENTION

1. Listen to sound of character.
2. Recognize character by sight in correct relative position for finger stroke.
3. Strike the key.

The invention described herein may be manufactured and used by or for the Government of the United States of America for governmental purposes without the payment of any royalties thereon or therefor.

Having described my invention, what I claim is:

1. Control means for electrical apparatus combining a plurality of associated circuits comprising: a base; individual switching means secured to said base for each circuit associated with said apparatus; means within said base for accommodating the base of a typewriter; an arrangement of said switching means upon said base in banks and rows to correspond with a typewriter keyboard; and means in the actuating member of each of said switching means for making separable operative contact with a key lever of a superimposed typewriter; whereby, with a typewriter superimposed upon said base, and with said switching means in contact with the key levers thereof, depressing the typewriter keys will operate said switching means, or with said typewriter removed, said switching means may be operated by hand.

2. In an electrical switching device for operation from a typewriter keyboard, two spaced and insulated contacts, a spring loaded push rod normally above and out of touch with said contacts, means for supporting said push rod adjacent to said contacts, means at the end of said push rod adjacent to said contacts for closing an electrical circuit therethrough, and means at the opposite end of said push rod for making separable connection with the key lever of a typewriter, whereby depressing a typewriter key, whose lever is connected as described, will cause said push rod to move against the force of said spring to complete an electrical circuit through said contacts.

3. An apparatus in accordance with claim 2, characterized by said push rod having a slotted end capable of separably embracing in operative contact a typewriter key lever.

4. In an educational apparatus in combination, a translucent display portraying the arrangement of a typewriter keyboard, individual illuminating means within said display for the various keys represented thereon, a control unit adapted for operation by hand or from the keyboard of a typewriter detachably superimposed thereon, individual switching means within said control unit to operate said illuminating means, each of said switching means being adapted to detachably contact one key lever of a typewriter, and circuits connecting said switching means with said illuminating means, whereby, with appropriate power supplied, depressing a key on a typewriter superimposed upon said control unit will cause its corresponding character to appear illuminated on the face of said display, each of said switching means having a slotted stem capable of separably embracing in operative contact a typewriter key lever.

5. In an educational apparatus in combination, a translucent display showing normally on its face the key arrangement of a typewriter keyboard, individual illuminating means within said display for each character to be presented on the face thereof, a control unit adapted for operation from the keyboard of a typewriter detachably superimposed thereon or directly by hand, individual switching means within said control unit to operate said illuminating means, each of said switching means being adapted to detachably contact one key lever of a typewriter, circuits connecting said switching means with said illuminating means, and written characters on the reverse side of the face of said display corresponding to the characters normally appearing on the respective keys represented on the face thereof, whereby, with appropriate power supplied, depressing a key on a typewriter superimposed upon said control unit will cause its corresponding character which is not otherwise visible to appear illuminated and in place on its proper key at the front of said display, each of said switching means having a slotted stem capable of separably embracing in operative contact a typewriter key lever.

6. Control means for electrical apparatus combining a plurality of associated circuits comprising: a base; individual switching means secured to said base for each circuit associated with said apparatus; means within said base for accommodating the base of a typewriter; an arrangement of said switching means upon said base in banks and rows to correspond with a typewriter keyboard; and means in the actuating member of each of said switching means for making separable operative contact with a key lever of a superimposed typewriter; whereby, with a typewriter superimposed upon said base, and with said switching means in contact with the key levers thereof, depressing the typewriter keys will operate said switching means, or with said typewriter removed, said switching means may be operated by hand, each of said switching means having a slotted stem capable of separably embracing in operative contact a typewriter key lever.

7. In an electrical switching device for operation from a typewriter keyboard, two spaced and insulated contacts, a spring loaded push rod normally above and out of touch with said contacts, means for supporting said push rod adjacent to said contacts, means at the end of said push rod adjacent to said contacts for closing an electrical circuit therethrough, and means at the opposite end of said push rod for making separable connection with the key lever of a typewriter, whereby depressing a typewriter key, whose lever is connected as described, will cause said push rod to move against the force of said spring to complete an electrical circuit through said contacts, said push rod having a slotted end capable of separably embracing in operative contact a typewriter key lever.

CLARENCE N. SMITH.